United States Patent

[11] 3,607,648

[72] Inventors Masahiko Yoneda
 Kobe;
 Ken-Ichi Sasjima, Ikeda, both of Japan
[21] Appl. No. 795,045
[22] Filed Jan. 29, 1969
[45] Patented Sept. 21, 1971
[73] Assignee Takeda Chemical Industries, Ltd.
 Osaka, Japan
[32] Priority Feb. 1, 1968
[33] Japan
[31] 43/6224

[54] METHOD FOR THE PRODUCTION OF D-RIBOSE
 10 Claims, No Drawings
[52] U.S. Cl............................................. 195/28,
 195/31, 195/96
[51] Int. Cl................................................ C12d 13/02
[50] Field of Search.................................... 195/11, 28,
 29, 43, 96

[56] References Cited
 OTHER REFERENCES
 "Chemical Abstract" 63:19000g (1965)
 Ibid 66:74956a (24 Apr. 67)
 Ibid 67:40093x (28 Aug. 67)

*Primary Examiner*—A. Louis Monacell
*Assistant Examiner*—Max D. Hensley
*Attorney*—Wenderoth, Lind & Ponack ABSTRACT: D-ribose is produced by culturing a D-ribose-producing micro-organism of the genus *Bacillus*, said micro-organism requiring L-tyrosine, L-tryptophan and L-phenylalanine in a proper culture medium. The accumulated D-ribose is subsequently recovered from the medium.

METHOD FOR THE PRODUCTION OF D-RIBOSE

This invention relates to a method for the production of D-ribose. More particularly it relates to a method for the production of D-ribose comprising inoculating a D-ribose-producing micro-organism of the genus *Bacillus*, said micro-organism requiring L-tyrosine, L-tryptophan and L-phenylalanine for its growth, into a culture medium containing L-tyrosine, L-tryptophan and L-phenylalanine, each in an amount of more than about 100 γ/ml., in addition to assimilable carbon and nitrogen sources; incubating the culture medium until D-ribose is accumulated therein, and recovering D-ribose thus accumulated from the culture medium.

D-ribose is important, for example, as a starting material in the synthesis of riboflavin compounds and as a raw material in the production of nucleotide condiments which have recently been developed.

Heretofore there have been known several methods for producing D-ribose employing micro-organisms, but they are hardly feasible commercially, because they give only small amounts of D-ribose.

According to the present invention, the incubation of certain micro-organisms of the genus *Bacillus* brings about accumulation of D-ribose in a remarkably large amount in the culture medium, and D-ribose accumulated in this way is easily recoverable from the culture medium.

The object of this invention is to provide a method for the production of D-ribose, which can put into practice on an industrial scale with a good yield.

This object is realized by inoculating a D-ribose-producing micro-organism of the genus *Bacillus*, said micro-organism requiring L-tyrosine, L-tryptophan and L-phenylalanine, for its growth, into a culture medium containing L-tyrosine, L-tryptophan and L-phenylalanine, and incubating the culture medium.

Hereinafter the micro-organisms of the type mentioned above are simply referred to as "the micro-organism(s)

The micro-organisms are derived from wild type strains by means of a per se conventional technique of mutation or they are isolated from wild type strains.

More concretely stated, the mutation may be effected by subjecting wild type strains belonging to the genus *Bacillus* to the treatment with, for example, ultra violet ray, X-ray gamma ray, a mutagen such as nitrosoguanidine, etc.

The micro-organisms are, for example, the mutants of *Bacillus pumilus* such as *Bacillus pumilus* No. 503 (IFO 12600, ATCC 21356), *Bacillus pumilus* No. 537 (IFO 12601, ATCC 21357), *Bacillus pumilus* No. 558 (IFO 12602, ATCC 21358), and the like, and the mutants of *Bacillus subtilis* such as *Bacillus subtilis* No. 429 (IFO 12603, ATCC 21359), *Bacillus subtilis* No. 483 (IFO 12604, ATCC 21360), and the like.

Representable microbiological characteristics of those micro-organisms are such that they cannot utilize for their growth D-gluconic acid, L-arabinose or D-ribose as the carbon source and that they require for their growth L-tyrosine, L-tryptophan and L-phenylalanine. In other microbiological aspects, their properties are identical with those set forth in Bergy's manual of Determinative Bacteriology, 620–622 (1957).

For the purpose of the industrial production of D-ribose, cultivation of the micro-organisms is in general preferably carried out in a liquid culture medium. The incubation is carried out generally as a submerged process under aeration and agitation, employing a culture medium necessarily containing L-tyrosine, L-tryptophan and L-phenylalanine.

Though L-tyrosine, L-tryptophan and L-phenylalanine may be added to the culture medium in the respectively isolated form, such a natural substance containing them as dried yeast, peptone, meat extract, casamino acid, corn steep liquor, etc. and their mixture may also be employed.

L-tyrosine, L-tryptophan and L-phenylalanine should be added to the culture medium in a sufficient amount for the growth of the micro-organisms. Generally, L-tyrosine, L-tryptophan and L-phenylalanine are added to the culture medium so as to make their respective concentration higher than 100 γ/ml. and preferably lower than 5,000 γ/ml.

As the assimilable carbon source, use may be made of one or more of the compounds such as monosaccharides, e.g. D-glucose, D-fructose, D-mannose, sorbitol, D-mannitol, etc., disaccharides, e.g. sucrose, maltose, etc. various polysaccarides, e.g. dextrin, soluble starch, etc. blackstrap molasses and the like.

As the assimilable nitrogen source, for example, use may be made of inorganic nitrogen compounds such as ammonium sulfate, ammonium nitrate, etc. as well as organic nitrogenous matters such as urea. Furthermore, a small quantity of inorganic salts such as magnesium sulfate, calcium phosphate, calcium carbonate, etc., may be employed.

Incubation temperature should be controlled so as to accumulate the desired substance in the maximum amount. Generally, the temperature is adjusted within a range of from 25° to 45° C.

Incubation is continued until the maximum amount of D-ribose is accumulated in the culture medium. Although the period required for the maximum accumulation of D-ribose depends upon various factors, it usually falls between 24 to 120 hours from the start of the incubation.

The culture broth at the completion of cultivation contains a large amount of D-ribose. Since a major portion of the D-ribose thus produced is accumulated in the liquid phase of the broth, it is recommended, to begin with, to filter off the cells and, then, recover the D-ribose from the filtrate. For example, the D-ribose can be recovered by desalting the filtrate with an ion-exchange resin and decolorizing the same with the aid of a carbon powder column.

When the culture broth at the end of cultivation contains raw material carbohydrates in addition to the desired D-ribose, those carbohydrate materials may be removed through any of per se known processes, e.g. by treating the broth with glucose-oxidase in case of using D-glucose as material carbohydrates or with bakers yeast which does not utilize D-ribose but does utilize another carbohydrate alone.

The following examples are merely intended to illustrate presently preferred embodiments of this invention and not to restrict the scope thereof.

In the foregoing disclosure as well as in the following examples, the abbreviations γ, mg., g., ml., cm., °C, IFO and ATCC refer respectively to gamma(s), milligram(s), gram(s), milliliter(s), centimeter(s), degrees centigrade, "Institute for Fermentation," "Osaka" and "American Type Culture Collection" respectively. Percentages are weight/volume unless otherwise described.

EXAMPLE 1

*Bacillus pumilus* mutant No. 503 (IFO 12600) (ATCC 21356), which was derived from *Bacillus pumilus* (ATCC No. 7061) by irradiation with ultraviolet ray, followed by subjecting to penicillin screening (Experientia, 6, 41 (1950)) and to replica plating method (Journal of Bacteriology, 63, 399 (1952)), is innoculated into 500 ml. of a medium containing 2 percent of soluble starch, 2 percent of corn steep liquor, 0.3 percent of dipotassium hydrogenphosphate and 0.1 percent of potassium dihydrogenphosphate. The medium is incubated at 28° C. for 24 hours to prepare a seed culture. This seed culture is inoculated into 30 liters of a medium (hereinafter called Medium A) which contains 12.5 percent of D-glucose, 2.5 percent of dried yeast, 1.5 percent of ammonium sulfate, 0.5 percent of calcium secondary phosphate, 0.5 percent of calcium tertiary phosphate and 1.0 percent of calcium carbonate. The medium is incubated at 32° C. for 66 hours under constant aeration and agitation. The above procedure yields 28.5 mg./ml. of D-ribose in the culture broth.

The above D-ribose-containing broth is passed through a column of activated carbon (15 cm. by 100 cm.), and the effluent is concentrated to about 5 liters under reduced pressure, which effluent is incubated after addition of 10 percent of bakers yeast at 37° C. for 1 hour. After the yeast cells was removed by filtration, the concentrate is further passed, for desalting, through layers of respectively cation exchange The whole was passed into an oven at 150° C., and kept there for 1-2 minutes. Thereafter, onto the previous layer a second layer (foamed) was spread, which consisted of:

| | |
|---|---|
| PVC, paste making resin, having a K-value of 72 | 100 parts (by weight) |
| dioctyl phthalate | 80 parts (by weight) |
| azodicarbonamide | 2 parts (by weight) |
| dibasic lead phthalate (stabilizing kicker) | 2 parts (by weight) |
| $TiO_2$ | 5 parts (by weight) |
| polypropylene flakes | 5 parts (by weight) |

The initial thickness of this layer was 200 microns.

The whole was then passed into an oven at 200° C. and kept there for 1-2 minutes. The release paper was then removed. The system was then subjected to a slight tension in order to facilitate the separation of those components that were incompatible with each other; then the system was coupled to a cotton jersey fabric (with the second layer adjacent to the fabric), after preliminarily having spread on the fabric some plastisol of the first layer which served as a binder. Said coupling occurred in about 1 minute in an oven heated to 150-170° C.

The poromeric material thus obtained showed the following air transpiration rates:

| Pressure (mm. Hg) | $cm.^3$ of air Hr. $cm.^2$ |
|---|---|

The release paper was then removed and the system was subjected to a slight tension and subsequently was coupled to a jersey fabric made of polyamide fibers, the second layer being adjacent to the fabric after preliminary having spread on the fabric some plastisol of the first layer which serves as a binder.

The poromeric material thus obtained shows the following air transpiration rates:

| Pressure (mm.Hg) | $cm.^3$ of air hr. $cm.^2$ |
|---|---|
| 20 | 2.0 |
| 40 | 80 |
| 60 | 121 |
| 100 | 205 |
| 150 | 270 |

Example 3

On a device for the preparation of artificial leather substrate of release paper was spread coated with a plastisol consisting of (layer 1, compact):

| | |
|---|---|
| PVC, paste making resin with a K-value = 70 | 100 parts (by weight) |